(12) United States Patent
Skala

(10) Patent No.: US 8,048,585 B2
(45) Date of Patent: Nov. 1, 2011

(54) FUEL CELL MEMBRANE HUMIDIFIER PLATE DESIGN

(75) Inventor: Glenn W. Skala, Churchville, NY (US)

(73) Assignee: GM Global Technology Operations LLC, Detroit, MI (US)

(*) Notice: Subject to any disclaimer, the term of this patent is extended or adjusted under 35 U.S.C. 154(b) by 916 days.

(21) Appl. No.: 11/868,760

(22) Filed: Oct. 8, 2007

(65) Prior Publication Data

US 2009/0092863 A1 Apr. 9, 2009

(51) Int. Cl.
*H01M 8/00* (2006.01)
(52) U.S. Cl. .................. 429/456; 429/457; 429/460
(58) Field of Classification Search .......... 429/456, 429/457, 460
See application file for complete search history.

(56) References Cited

U.S. PATENT DOCUMENTS

| 6,864,005 | B2 | 3/2005 | Mossman |
| 2001/0046616 | A1 | 11/2001 | Mossman |
| 2003/0051451 | A1* | 3/2003 | Kusunose et al. ............ 55/320 |
| 2004/0234829 | A1 | 11/2004 | Sederquist et al. |
| 2006/0228597 | A1 | 10/2006 | Mossman |

* cited by examiner

*Primary Examiner* — Jane Rhee
(74) *Attorney, Agent, or Firm* — Fraser Clemens Martin & Miller LLC; J. Douglas Miller

(57) ABSTRACT

A plate for a membrane humidifier for a fuel cell system is disclosed, wherein the plate includes a top layer formed from a diffusion medium and a bottom layer formed from a diffusion medium with an array of substantially planar elongate ribbons disposed therebetween.

18 Claims, 4 Drawing Sheets

FUEL CELL MEMBRANE HUMIDIFIER PLATE DESIGN

FIELD OF THE INVENTION

The invention relates to a fuel cell system and more particularly to a plate for a membrane humidifier for a fuel cell.

BACKGROUND OF THE INVENTION

Fuel cell systems are increasingly being used as a power source in a wide variety of applications. Fuel cell systems have been proposed for use in power consumers such as vehicles as a replacement for internal combustion engines, for example. Such a system is disclosed in commonly owned U.S. patent application Ser. No. 10/418,536, hereby incorporated herein by reference in its entirety. Fuel cell systems may also be used as stationary electric power plants in buildings and residences, as portable power in video cameras, computers, and the like. Typically, the fuel cell systems generate electricity used to charge batteries or to provide power for an electric motor.

Fuel cells are electrochemical devices which directly combine a fuel such as hydrogen and an oxidant such as oxygen to produce electricity. The oxygen is typically supplied by an air stream. The hydrogen and oxygen combine to result in the formation of water. Other fuels can be used such as natural gas, methanol, gasoline, and coal-derived synthetic fuels, for example.

The basic process employed by a fuel cell system is efficient, substantially pollution-free, quiet, free from moving parts (other than an air compressor, cooling fans, pumps and actuators), and may be constructed to leave only heat and water as by-products. The term "fuel cell" is typically used to refer to either a single cell or a plurality of cells, depending upon the context in which it is used. The plurality of cells is typically bundled together and arranged to form a stack, with the plurality of cells commonly arranged in electrical series. Since single fuel cells can be assembled into stacks of varying sizes, systems can be designed to produce a desired energy output level providing flexibility of design for different applications.

Different fuel cell types can be provided such as phosphoric acid, alkaline, molten carbonate, solid oxide, and proton exchange membrane (PEM), for example. The basic components of a PEM-type fuel cell are two electrodes separated by a polymer membrane electrolyte. Each electrode is coated on one side with a thin catalyst layer. The electrodes, catalyst, and membrane together form a membrane electrode assembly (MEA).

In a typical PEM-type fuel cell, the MEA is sandwiched between "anode" and "cathode" diffusion media (hereinafter "DM's") or diffusion layers that are formed from a resilient, conductive, and gas permeable material such as carbon fabric or paper. The DM's serve as the primary current collectors for the anode and cathode, as well as provide mechanical support for the MEA. Alternatively, the DM may contain the catalyst layer and be in contact with the membrane. The DM's and MEA are pressed between a pair of electronically conductive plates which serve as secondary current collectors for collecting the current from the primary current collectors. The plates conduct current between adjacent cells internally of the stack in the case of bipolar plates and conduct current externally of the stack in the case of monopolar plates at the end of the stack.

The secondary current collector plates each contain at least one active region that distributes the gaseous reactants over the major faces of the anode and cathode. These active regions, also known as flow fields, typically include a plurality of lands which engage the primary current collector and define a plurality of grooves or flow channels therebetween. The channels supply the hydrogen and the oxygen to the electrodes on either side of the PEM. In particular, the hydrogen flows through the channels to the anode where the catalyst promotes separation into protons and electrons. On the opposite side of the PEM, the oxygen flows through the channels to the cathode where the oxygen attracts the hydrogen protons through the PEM. The electrons are captured as useful energy through an external circuit and are combined with the protons and oxygen to produce water vapor at the cathode side.

Many fuel cells use internal membranes, such as the PEM type fuel cell which includes proton exchange membranes, also referred to as polymer electrolyte membranes. In order to perform within a desired efficiency range, it is desirable to maintain the membranes in a moist condition. Therefore, it is necessary to provide a means for maintaining the fuel cell membranes in the moist condition. This helps avoid damage to or a shortened life of the membranes, as well as to maintain the desired efficiency of operation. For example, lower water content of the membrane leads to a higher proton conduction resistance, thus resulting in a higher ohmic voltage loss. The humidification of the feed gases, in particular at the cathode inlet, is desirable in order to maintain sufficient water content in the membrane. Humidification in a fuel cell is discussed in commonly owned U.S. patent application Ser. No. 10/797,671 to Goebel et al.; commonly owned U.S. patent application Ser. No. 10/912,298 to Sennoun et al.; and commonly owned U.S. patent application Ser. No. 11/087,911 to Forte, each of which is hereby incorporated herein by reference in its entirety.

To maintain a desired moisture level, an air humidifier is frequently used to humidify the air stream used in the fuel cell. The air humidifier normally consists of a round or box type air humidification module that is installed into a housing of the air humidifier. Examples of this type of air humidifier are shown and described in U.S. patent application Ser. No. 10/516,483 to Tanihara et al., hereby incorporated herein by reference in its entirety, and U.S. Pat. No. 6,471,195, hereby incorporated herein by reference in its entirety.

Membrane humidifiers have also been utilized to fulfill fuel cell humidification requirements. For the automotive fuel cell humidification application, such a membrane humidifier needs to be compact, exhibit low pressure drop, and have high performance characteristics. Typical membrane humidifiers include a wet plate that includes a plurality of flow channels formed therein adjacent a DM. The flow channels are adapted to convey a wet gas from the cathode of the fuel cell to the exhaust. Typical membrane humidifiers also include a dry plate that includes a plurality of flow channels formed therein adjacent a DM. The flow channels are adapted to convey a dry gas from a source of gas to the cathode of the fuel cell. A similar membrane humidifier assembly can be used for an anode side of the fuel cell, or otherwise as desired.

The flow channels are typically formed on both sides of the wet plate and the dry plate, which are separated by a web. The web militates against the deformation of the material forming the flow channels. By utilizing the web for support of the plates and flow channels, the overall dimensions of the plates and the flow channels are increased, thereby resulting in increased material and manufacturing costs, as well as an increased fabrication time of the membrane humidifier.

Typically, a DM is disposed adjacent the flow channels on each side of the wet plate and each side of the dry plate. To militate against movement of the DM's, an adhesive is manually applied to the wet plate and the dry plate or the DM's, and the plates and DM's are pressed together. Manually applying the adhesive to the plates or DM's increases the assembly time and the manufacturing cost of the membrane humidifier. Furthermore, the presence of the adhesive increases the overall dimensions of the plates, thereby resulting in increased material and manufacturing costs of the membrane humidifier.

It would be desirable to produce plates for a membrane humidifier, wherein the dimensions of the plates, the material costs of the membrane humidifier and the plates, and the assembly time of the membrane humidifier are minimized.

SUMMARY OF THE INVENTION

Concordant and congruous with the present invention, a plate for a membrane humidifier, wherein the dimensions of the plate, the material costs of the membrane humidifier and the plate, and the assembly time of the membrane humidifier are minimized, has surprisingly been discovered.

In one embodiment, the plate for a membrane humidifier for a fuel cell comprises a substantially planar top layer formed from a diffusion medium; a substantially planar bottom layer formed from a diffusion medium; and a substantially planar array of elongate ribbons disposed between said top layer and said bottom layer to define a plurality of flow channels therebetween, said ribbons produced from a polymeric material.

In another embodiment, the plate for a membrane humidifier for a fuel cell comprises a substantially planar top layer formed from a diffusion medium; a substantially planar bottom layer formed from a diffusion medium; a substantially planar array of elongate ribbons disposed between said top layer and said bottom layer to define a plurality of flow channels therebetween, said ribbons produced from a polymeric material; a first sealing bar having at least a portion thereof disposed between said top layer and said bottom layer; and a second sealing bar having at least a portion thereof disposed between said top layer and said bottom layer.

In another embodiment, the A method for making a plate for a membrane humidifier for a fuel cell system, the method comprises the steps of providing a substantially planar top layer formed from a diffusion medium; providing a substantially planar bottom layer formed from a diffusion medium; providing a substantially planar array of elongate ribbons and disposing the ribbons between the top layer and the bottom layer to define a plurality of flow channels therebetween, the ribbons produced from a polymeric material; and adhering the ribbons to the top layer and the bottom layer.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENTS

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
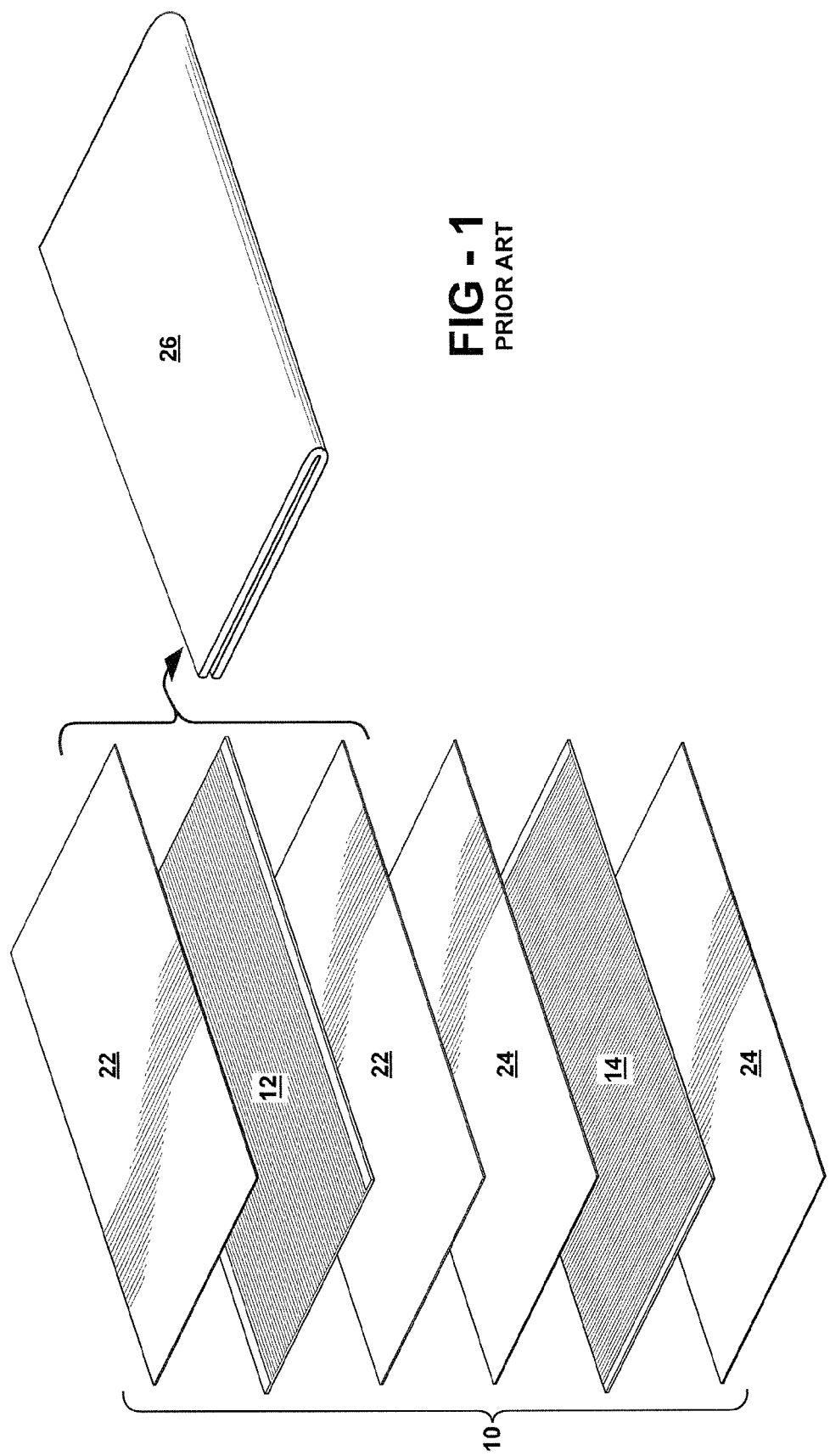
FIG. 1 is an exploded perspective view of a membrane humidifier assembly as known in the art.
Figure 2:
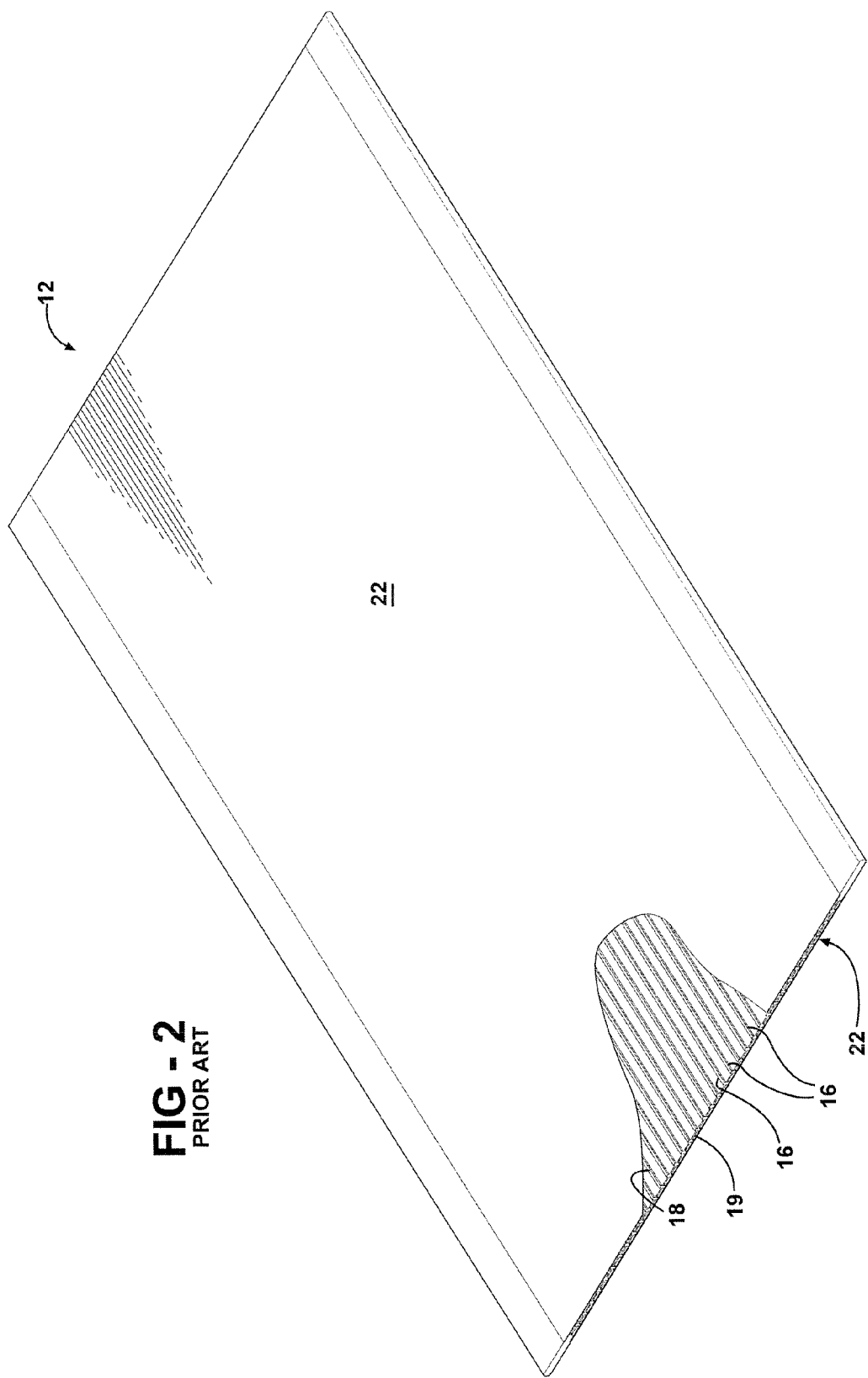
FIG. 2 is a perspective view of a wet plate of the membrane humidifier assembly of FIG. 1.

FIG. 1 illustrates a membrane humidifier assembly 10 for a fuel cell system (not shown) as known in the art. The membrane humidifier assembly 10 includes a wet plate 12, a dry plate 14, diffusion media 22, 24, and a membrane 26. The membrane humidifier assembly 10 for a cathode side of the fuel cell is described. However, it is understood that the membrane humidifier assembly 10 can be used for an anode side of the fuel cell or otherwise as desired. The wet plate 12 includes a plurality of flow channels 16 formed therein, as illustrated in FIG. 2. A land 18 is formed between each of the laterally adjacent channels 16 in the wet plate 12, while a web 19 is formed between vertically adjacent flow channels 16. The channels 16 are adapted to convey a wet gas from the cathode of the fuel cell to an exhaust (not shown).

The dry plate 14 is similar to the wet plate 12 as described herein. The dry plate 14 includes a plurality of flow channels (not shown) formed therein. Similar to the wet plate 12, a land (not shown) is formed between each of the laterally adjacent channels in the dry plate 14, while a web (not shown) is formed between vertically adjacent channels. The channels are adapted to convey a dry gas from a source of gas (not shown) to the cathode of the fuel cell. As used herein, wet gas means a gas such as air and gas mixtures of $O_2$, $N_2$, $H_2O$, and $H_2$, for example, including water vapor and/or liquid water therein at a level above that of the dry gas. Dry gas means a gas such as air and gas mixtures of $O_2$, $N_2$, $H_2O$, and $H_2$, for example, absent water vapor or including water vapor and/or liquid water therein at a level below that of the wet gas. It is understood that other gases or mixtures of gases can be used as desired.

A diffusion medium or diffusion layer 22 is disposed adjacent both sides of the wet plate 12 and abuts the lands 18 thereof. Similarly, a diffusion medium or diffusion layer 24 is disposed adjacent both sides of the dry plate 14 and abuts the lands thereof. As shown in FIG. 1, the membrane 26 is disposed between the diffusion medium 22 and the diffusion medium 24. The membrane 26 can be any conventional membrane such as perfluorosulfonic acid (PFSA) such as sold under the trademark Nafion®, hydrophilic polymer membranes, and polymer composite membranes, for example. It is understood that additional wet plates 12, dry plates 14, diffusion media 22, 24, and membranes 26 can be used as desired.

Figure 3:
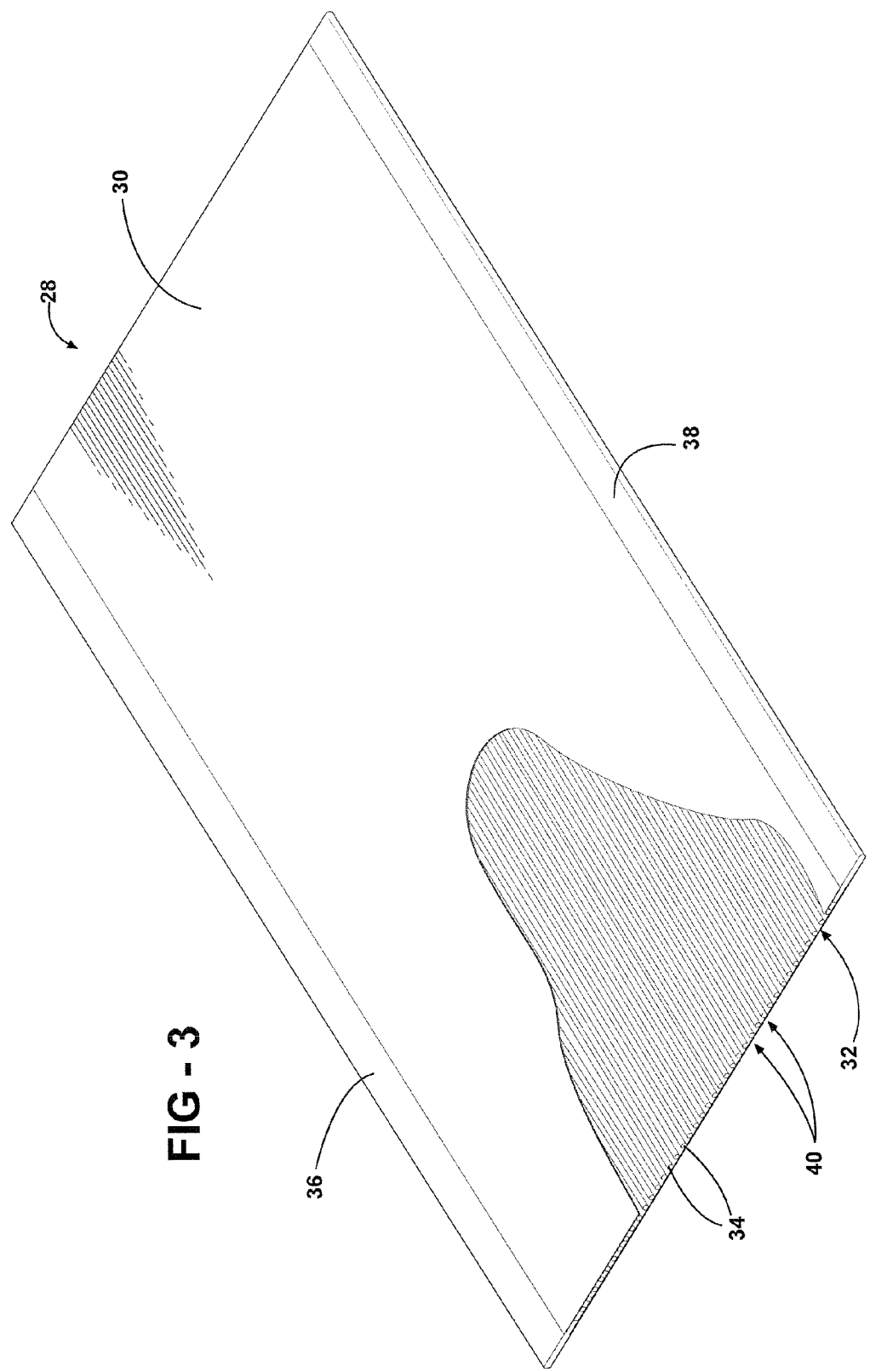
FIG. 3 is a perspective view of a plate for a membrane humidifier assembly according to an embodiment of the invention.
Figure 4:
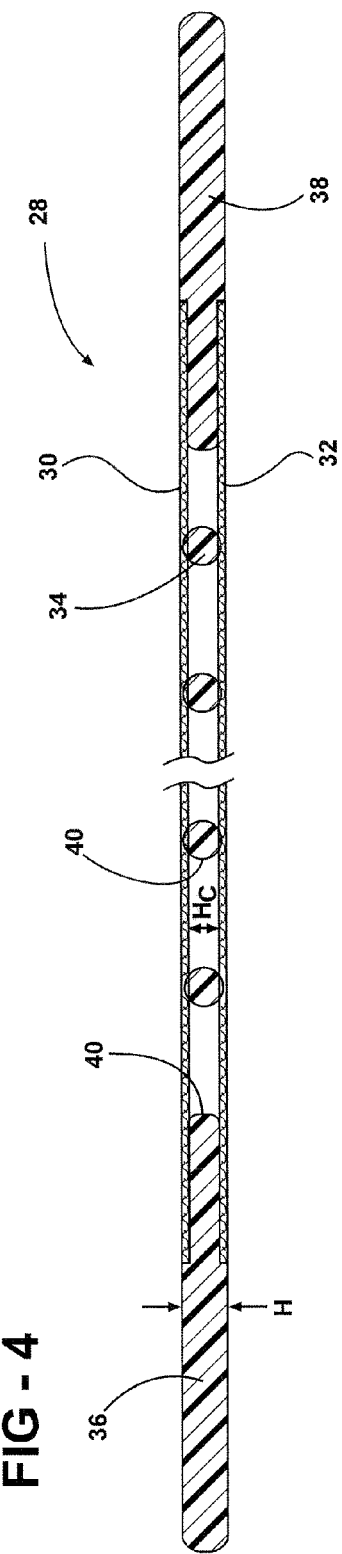
FIG. 4 is a front elevational view of the plate illustrated in FIG. 2 and showing flow channels formed therein.

FIGS. 3 and 4 illustrate a plate 28 according to an embodiment of the invention. The plate 28 includes a substantially planar top layer 30, a substantially planar bottom layer 32, a first substantially planar sealing bar 36, a second substantially planar sealing bar 38, and a substantially planar array of elongate ribbons 34. For the embodiment shown and described herein, the plate 28 is a wet plate for a membrane humidifier assembly (not shown) similar to the membrane assembly 10 described herein. However, it is understood that the plate 28 can be a dry plate for the membrane humidifier assembly 10. In the embodiment shown, the top layer 30 and the bottom layer 32 are diffusion media. The diffusion media may be formed from any conventional material such as a glass fiber, a glass based-paper, a carbon fabric, a paper, and the like, for example.

A portion of the first sealing bar 36 is disposed between and adhered to an outer edge of each of the top layer 30 and the bottom layer 32. A portion of the second sealing bar 38 is disposed between and adhered to an outer edge of each of the top layer 30 and the bottom layer 32. It is understood that the sealing bars 36, 38 can be entirely disposed between the top layer 30 and the bottom layer 32 without departing from the scope and spirit of the invention. In the embodiment shown, portions of the sealing bars 36, 38 are melt formed with the top layer 30 and the bottom layer 32. The sealing bars 36, 38 may be formed with the top layer 30 and the bottom layer 32 by heating the sealing bars 36, 38 to a temperature just below a melting temperature thereof and pressing or rolling the top layer 30, the sealing bars 36, 38, and the bottom layer 32 to facilitate the sealing thereof. Alternatively, the top layer 30 and the bottom layer 32 may be heated to the temperature just below the melting temperature of the sealing bars 36, 38 and pressed or rolled with the sealing bars 36, 38. The sealing bars 36, 38 may also be adhered to the top layer 30 and the bottom layer 32 with an adhesive such as a B-stage epoxy, ethylene vinyl acetate, polyvinylideneifluoride, and a pressure sensitive adhesive, for example. Any conventional material can be used to form the sealing bars 36, 38 such as a steel, a polymer, graphite, and a composite material, for example.

In the embodiment shown in FIGS. 3 and 4, the ribbons 34 are disposed between and at least partially adhered to the top layer 30 and the bottom layer 32. The ribbons 34 are polymer strands having a cylindrical shape and a substantially circular cross-sectional shape. Favorable results have been obtained with ribbons 34 having a diameter of about 0.55 mm, but other diameters may be used, as desired. It is understood that any conventional material can be used to form the ribbons 34 such as steel, polymers, graphite, and composite materials, for example. It is also understood that the ribbons 34 may have any shape and cross-sectional shape, as desired. The ribbons 34 cooperate with the top layer 30 and the bottom layer 32 to define a plurality of flow channels 40 therebetween. A portion of each ribbon 34 is bonded with the top layer 30, and another portion of each ribbon 34 is bonded with the bottom layer 32. The ribbons 34 may be formed with the top layer 30 and the bottom layer 32 by heating the ribbons 40 to a temperature just below a melting temperature thereof and pressing or rolling the top layer 30, the ribbons 34, and the bottom layer 32. Alternatively, the top layer 30 and the bottom layer 32 may be heated to the temperature just below the melting temperature of the ribbons 34 and pressed or rolled into the ribbons 34. The ribbons 34 may also be adhered to the top layer 30 and the bottom layer 32 with an adhesive such as a B-stage epoxy, ethylene vinyl acetate, polyvinylideneifluoride, and a pressure sensitive adhesive, for example.

Figure 5:
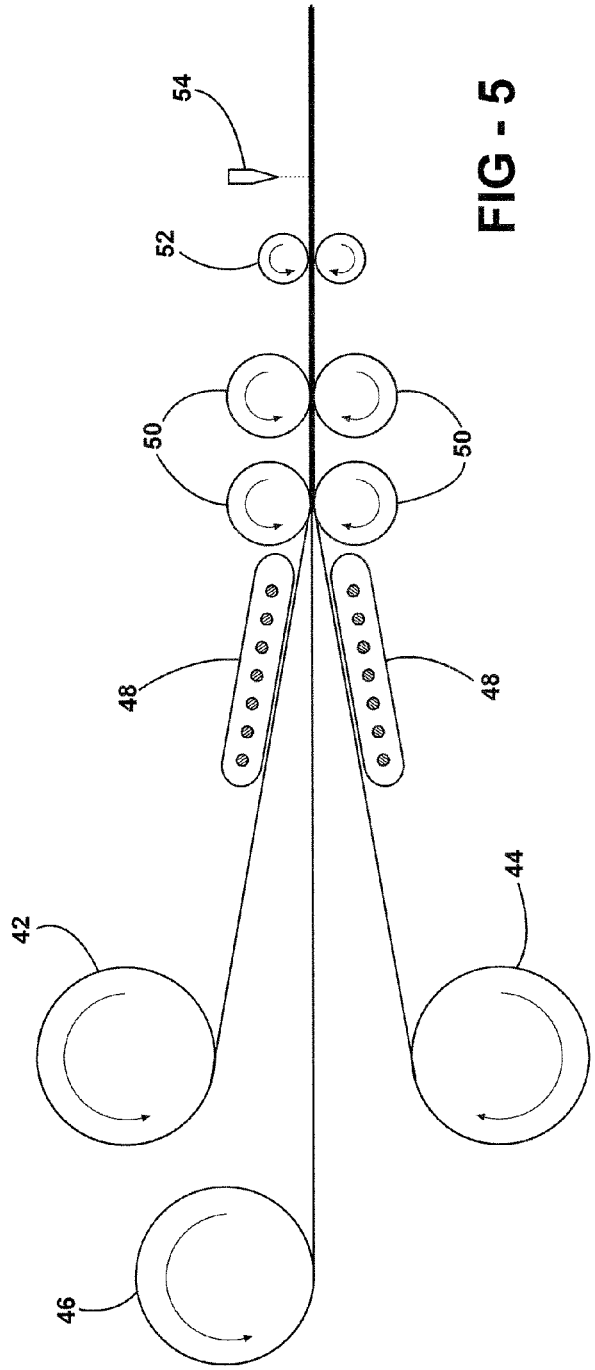
FIG. 5 is a schematic view of a process for forming the plate of FIG. 3 according to an embodiment of the invention.

The plate 28 may be formed by separately assembling each component of the plate 28. Alternatively, the top layer 30, the bottom layer 32, and the ribbons 34 may be assembled and adhered to form the plate 28 by a continuous process. FIG. 5 is a schematic illustration of a method of forming the plate 28 according to an embodiment of the invention. The material forming the top layer 30 is provided from a first source 42. The material forming the bottom layer 32 is provided from a second source 44. The material forming the first sealing bar 36 is provided from a third source 46. It is understood that the sources 42, 44, 46 may be bulk rolls of material, or the sources 42, 44, 46 may be extruders that extrude and provide a substantially continuous feed of the respective materials.

In the embodiment shown, the material forming the ribbons 34 is also provided from the third source 46 and is produced from the same material. However, the material forming the ribbons 34 may be provided from another source and produced from a different material, as desired. The ribbons 34 are disposed between the top layer 30 and the bottom layer 32 to produce an array of spaced apart elongate ribbons 34 having the flow channels 40 formed therebetween. Favorable results have been obtained for the plate 28 having ribbons 34 spaced apart at intervals of 1.5 mm to 2.0 mm, although other spacing intervals can be used as desired. The material forming the second sealing bar 38 is also provided from the third source 46. The materials forming the top layer 30 and the bottom later 32 are heated to the temperature below the melting temperature of the material forming the sealing bars 36, 38 and the ribbons 34 by a plurality of heaters 48. It is understood that the sealing bars 36, 38 and the ribbons 34 may be heated to the temperature below the melting temperature by the heaters 48. It is also understood that an adhesive formed on or extruded with the sealing bars 36, 38 and the ribbons 34 may be used to adhere the top layer 30 and the bottom layer 32 thereto. The heaters 48 may be any conventional heating device such as an infrared heater, an electric heater, a gas heater, and the like, for example. It is further understood that a second polymer may be bonded to the material from the third source 46 to facilitate the adhesion of the ribbons 34 to the layers 30, 32, or the second polymer may be co-extruded with the material from the third source 46 to facilitate the adhesion of the ribbons to the layers 30, 32.

The top layer 30 and the bottom layer 32 are then pressed or rolled with the sealing bars 36, 38 and the ribbons 34 by a plurality of rollers 50 to form a substantially fluid tight seal therebetween and form the plate 28. It is understood that a membrane (not shown) may be rolled and adhered to at least one of the layers 30, 32, as desired. The plate 28 is typically allowed to cool prior to further processing. Further processing may include a trimming operation to trim the plate 28 to a desired width by a first cutting device 52, and a trimming operation to trim the plate 28 a desired length by a second cutting device 54. The cutting devices 52, 54 may be any conventional cutting devices such as a shearing device, a water jet cutting device, and the like, for example. Further processing of the plate 28 may also include deposition of an adhesion primer thereto, a corona discharge treatment, and a radio frequency glow discharge treatment. Once further processing is complete, the plate 28 may be installed and used in the fuel cell system or otherwise, as desired.

Because the layers 30, 32 are adhered directly to the sealing bars 36, 38 and the ribbons 34, necessity for a web adapted to support the layers 30, 32 and the ribbons 34 is eliminated. Further, a height H and a flow channel height Hc of the plate 28 are minimized. Favorable results have been obtained for a height H of the plate 28 of less than or equal to 0.63 mm and a flow channel height Hc of less than or equal to 0.43 mm. However, other heights H and flow channel heights Hc can be used as desired. Eliminating the web from the plate 28 also maximizes a hydraulic diameter of the channels 40 and minimizes a material cost of producing the plate 28. By minimizing the height H of the plate 28, more plates 28 may be installed in a water vapor transfer (WVT) unit for use with the fuel cell system, or a smaller WVT unit may be used without affecting a performance thereof as compared to known WVT units. By minimizing the size of the WVT unit, the cost and size of the fuel cell system is minimized.

In operation, the wet side plate 28 is disposed adjacent and perpendicular to a dry plate (not shown) to provide a cross-flow configuration, similar to the configuration shown in FIG.

1. However other configurations such as parallel flow, for example, can be used as desired. A membrane (not shown) is disposed between the wet plate 28 and the dry plate to form a humidifier cell. A plurality of cells is then stacked in a WVT unit. A wet gas is caused to flow through the channels 40 formed in the wet side plates 28 in the WVT unit. The wet gas is received from a supply of wet gas. Any conventional means can be used to deliver the wet gas to the channels 40 such as a supply header in communication with the channels 40, for example. The wet gas may be supplied from an exhaust stream of the fuel cell system, as desired. The wet gas exits the channels 40 to the exhaust. A dry gas is caused to flow through the channels formed in the dry side plates. The dry gas is received from the supply of dry gas. Any conventional means can be used to deliver the dry gas to the channels such as a supply header in communication with the channels, for example. The dry gas then exits the channels formed in the dry side plate to a component of the fuel cell system such as a compressor (not shown), for example, or the dry gas may exit to the exhaust.

During flow of the wet gas through the channels 40 and the flow of the dry gas through the channels, the water molecular transport from the wet gas to the dry gas can involve the following modes: A) convection mass transport of water vapor in the channels 40 of the wet plate 28 and the channels of the dry plate; B) diffusion transport through the top layer 30 and the bottom layer 32 of the wet plate 28 and the layers of the dry plate; and C) water vapor transport through the membrane by diffusion. Additionally, if a pressure differential exists between the channels 40 in the wet plate 28 and the channels in the dry side plate, water is transferred through the membrane by hydraulic forces. In addition, if the wet gas stream and the dry gas stream are at different temperatures, heat transfer from the hot fluid to the membrane and from the membrane to the cold fluid may also impact transfer of water. Water may also condense or vaporize in the bulk phases (i.e. either fluid may contain entrained liquid water at RH>100%). An enthalpy exchange may also be present between the wet gas and the dry gas associated with water flux.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A plate for a membrane humidifier for a fuel cell comprising:
    a substantially planar top layer formed from a diffusion medium;
    a substantially planar bottom layer formed from a diffusion medium;
    a substantially planar array of elongate ribbons disposed between said top layer and said bottom layer to define a plurality of flow channels therebetween, said ribbons produced from a polymeric material; and
    a first sealing bar having a first portion and a second portion, the first portion having a thickness greater than a thickness of the second portion, the second portion of said first sealing bar sandwiched between said top layer and said bottom layer, wherein the thickness of the first portion is equal to a height of the plate, and the thickness of the second portion, a thickness of the top layer, and a thickness of the bottom layer combined is equal to the height of the plate.

2. The plate according to claim 1, further comprising a second sealing bar, at least a portion of said second sealing bar disposed between said top layer and said bottom layer.

3. The plate according to claim 1, wherein said top layer and said bottom layer are formed from one of a glass fiber, a glass based-paper, a carbon fabric, and a paper.

4. The plate according to claim 1, wherein said ribbons are formed from one of polypropylene, polyethylene, an ethylene-propylene copolymer, and polybutylene.

5. The plate according to claim 1, wherein said ribbons are at least partially adhered to said top layer and said bottom layer.

6. The plate according to claim 5, wherein said ribbons are adhered to said top layer and said bottom layer with an adhesive.

7. The plate according to claim 6, wherein the adhesive is one of a B-stage epoxy, ethylene vinyl acetate, polyvinylideneifluoride, and a pressure sensitive adhesive.

8. The plate according to claim 5, wherein said ribbons are heated and pressed with said top layer and said bottom layer to adhere said ribbons to said top layer and said bottom layer.

9. The plate according to claim 5, wherein said top layer and said bottom layer are heated and said ribbons are pressed with said top layer and said bottom layer to adhere said ribbons thereto.

10. The plate according to claim 1, wherein a combined height of said top layer, said bottom layer, and said ribbons is about 0.63 millimeters.

11. The plate according to claim 1, wherein said ribbons have a substantially circular cross sectional shape.

12. A plate for a membrane humidifier for a fuel cell comprising:
    a substantially planar top layer formed from a diffusion medium;
    a substantially planar bottom layer formed from a diffusion medium;
    a substantially planar array of elongate ribbons disposed between said top layer and said bottom layer to define a plurality of flow channels therebetween, said ribbons produced from a polymeric material;
    a first sealing bar having a first portion and a second portion, the first portion having a thickness greater than a thickness of the second portion, the second portion sandwiched between said top layer and said bottom layer, wherein the thickness of the first portion is equal to a height of the plate, and the thickness of the second portion, a thickness of the top layer, and a thickness of the bottom layer combined is equal to the height of the plate; and
    a second sealing bar having a first portion and a second portion, the first portion having a thickness greater than a thickness of the second portion, the second portion sandwiched between said top layer and said bottom layer, wherein the thickness of the first portion is equal to a height of the plate, and the thickness of the second portion, a thickness of the top layer, and a thickness of the bottom layer combined is equal to the height of the plate.

13. The plate according to claim 12, wherein said ribbons are adhered to said top layer and said bottom layer with one of a B-stage epoxy, ethylene vinyl acetate, polyvinylideneifluoride, and a pressure sensitive adhesive.

14. The plate according to claim 12, wherein said ribbons are heated and pressed with said top layer and said bottom layer to adhere said ribbons to said top layer and said bottom layer.

15. A method for making a plate for a membrane humidifier for a fuel cell system, the method comprising the steps of:
    providing a substantially planar top layer formed from a diffusion medium;

providing a substantially planar bottom layer formed from a diffusion medium;

providing a substantially planar array of elongate ribbons and disposing the ribbons between the top layer and the bottom layer to define a plurality of flow channels therebetween, the ribbons produced from a polymeric material;

adhering the ribbons to the top layer and the bottom layer; and providing at least a first sealing bar having a first portion and a second portion, the first portion having a thickness greater than a thickness of the second portion, the second portion sandwiched between the top layer and the bottom layer, wherein the thickness of the first portion is equal to a height of the plate, and the thickness of the second portion, a thickness of the top layer, and a thickness of the bottom layer combined is equal to the height of the plate.

16. The method of claim 15, further comprising the step of heating and pressing the top layer and the bottom layer with the ribbons to adhere the ribbons thereto.

17. The method of claim 15, further comprising the step of heating and pressing the ribbons with the top layer and the bottom layer to adhere the ribbons thereto.

18. The method of claim 15, further comprising the step of providing an adhesive for adhering the ribbons to the top layer and the bottom layer.

* * * * *